(12) United States Patent
Thomas

(10) Patent No.: US 6,560,005 B2
(45) Date of Patent: May 6, 2003

(54) ACOUSTO-OPTIC DEVICES

(75) Inventor: Timothy N. Thomas, Portland, OR (US)

(73) Assignee: TKD, Inc., Sherwood, OR (US)

(*) Notice: Subject to any disclaimer, the term of this patent is extended or adjusted under 35 U.S.C. 154(b) by 99 days.

(21) Appl. No.: 09/924,245

(22) Filed: Aug. 7, 2001

(65) Prior Publication Data

US 2003/0030886 A1 Feb. 13, 2003

(51) Int. Cl.[7] .................................................. G02F 1/11
(52) U.S. Cl. ........................ 359/305; 359/311; 359/312
(58) Field of Search ................................. 359/305, 311, 359/312; 385/1

(56) References Cited

U.S. PATENT DOCUMENTS

| | | | |
|---|---|---|---|
| 4,057,770 A | 11/1977 | Henningsen et al. | |
| 4,118,675 A | 10/1978 | Rahn et al. | |
| 4,169,662 A | 10/1979 | Kaule et al. | |
| 4,170,028 A | 10/1979 | DeBenedictis et al. | |
| 4,184,768 A | 1/1980 | Murphy et al. | |
| 4,257,016 A | 3/1981 | Kramer, Jr. et al. | |
| 4,527,866 A | 7/1985 | Bowman et al. | |
| 4,554,836 A | 11/1985 | Rudd | |
| 4,655,608 A | * 4/1987 | Goss et al. | 374/119 |
| 4,659,184 A | 4/1987 | Sohn | |
| 4,789,241 A | 12/1988 | Michal et al. | |
| 4,905,886 A | 3/1990 | Kennedy et al. | |
| 5,048,951 A | 9/1991 | Combe et al. | |
| 5,075,795 A | 12/1991 | Miller et al. | |
| 5,121,247 A | 6/1992 | Fujita et al. | |
| 5,126,874 A | * 6/1992 | Alfano et al. | 359/240 |
| 5,153,597 A | 10/1992 | Hueber et al. | |
| 5,317,162 A | 5/1994 | Pinsky et al. | |
| 5,689,362 A | 11/1997 | Kadota | |
| 5,825,464 A | 10/1998 | Feichtner | |
| 5,910,855 A | 6/1999 | Thomas | |
| 5,997,787 A | 12/1999 | Nelson et al. | |

FOREIGN PATENT DOCUMENTS

| | | |
|---|---|---|
| GB | 8308565 | 3/1983 |
| JP | 52012851 | 1/1977 |
| JP | 56125197 | 10/1981 |
| JP | 57114120 | 7/1982 |
| JP | 57135928 | 8/1982 |
| JP | 59126933 | 7/1984 |
| JP | 59182419 | 10/1984 |
| JP | 59184828 | 10/1984 |
| JP | 61288420 | 12/1986 |
| JP | 62215917 | 9/1987 |
| JP | 2146786 | 6/1990 |
| JP | 6082734 | 3/1994 |

OTHER PUBLICATIONS

Module 4–7 Electro–Optic and Acousto–Optic Devices, Mar. 6, 2001, pp. 1–30.

Acousto–Optic Modulators, Mar. 6, 2001, pp. 1–5.

\* cited by examiner

Primary Examiner—Scott J. Sugarman
Assistant Examiner—Richard Hanig
(74) Attorney, Agent, or Firm—Chernoff, Vilhauer, McClung & Stenzel, LLP

(57) ABSTRACT

An acousto-optic device comprises a first light source for producing a light beam, a light-transmitting material capable of transmitting the light beam along an optical path through the light-transmitting material, a light-absorbing material adjacent to the light-transmitting material, and a pulsed light source capable of directing a pulsed light beam at the light absorbing material so as to produce acoustic waves within the light-transmitting material that cross the optical path of the light beam from the first light source.

24 Claims, 4 Drawing Sheets

ACOUSTO-OPTIC DEVICES

BACKGROUND OF THE INVENTION

The present invention relates generally to acousto-optic devices, such as acousto-optic modulators (AOMs) and acousto-optic deflectors, and in particular to an acousto-optic device that utilizes a pulsed light source to generate acoustic waves.

Acousto-optic interaction occurs in all optical media when an acoustic wave and a laser beam are present in the medium. When an acoustic wave is launched into the optical medium, it generates a refractive index wave that behaves like a sinusoidal grating. An incident laser beam passing through this grating will be diffracted into several orders. With appropriate design, the first order beam has the highest efficiency. Its angular position is linearly proportional to the acoustic frequency, so that the higher the frequency, the larger the diffracted angle.

Conventional devices exist that modulate and/or deflect a beam of light using acoustic waves. These devices are known as acousto-optic modulators (AOM's) and/or acousto-optic deflectors (AOD's). AOM's and AOD's contain a glass or glass-like material that is transparent to the incident light beam. The beam of light enters one face of the glass material and exits a second face. A third face, normal to the propagation of the beam of light, has a piezoelectric material, such as lithium niobate, attached. Electrodes are deposited on the lithium niobate. High frequency sinusoidal AC electric drive signals are sent to the electrodes. The electrode in turn causes expansion and/or contraction of the piezo-electric material. The expansion/contraction of the piezo-electric material causes a sinusoidal force to be applied to the transparent (glass) material. The sinusoidal force becomes a wave traveling through the glass and is commonly referred to as a sound wave or acoustic wave. The frequency of the acoustic wave is related to the frequency of the sinusoidal AC electric drive signal. Sound frequencies from 1 kilohertz to 1 gigahertz are possible.

In the case of the AOM, the sound wave travels through the transparent material and the sound wave frequency is constant. The sound wave causes variations in density within the transparent material and causes the light beam to diffract. The diffracted beam of light leaves the transparent material at a different angle than the un-diffracted light beam. By turning the AC electric drive signal on or off, the diffracted beam can be modulated.

In the case of the AOD, the frequency of the AC electric drive signal is modulated. Varying the frequency of the AC electric drive signal causes the sound wave frequency in the glass to change. By varying the sound frequency, the diffracted light beam angle also varies. By applying a varying frequency AC electric drive signal the output light beam is made to scan from one angular output to another. The presence or absence of the AC electric drive signal is used to switch the light beam "on" or "off."

The performance of conventional acousto-optic modulators is limited by the use of the piezo-electric material and electrode. The modulation performance, deflection performance, and efficiency of an AOM or AOD is in part determined by the shape of the electrode on the piezo-electric material. The shape of the electrode on the piezo-electric material determines the shape of the sound field propagating through the glass material. The shape of the sound field in the glass effects the efficiency and alignment sensitivity of the AOM and AOD. Thus, the electrodes must be precisely shaped. This may be difficult due to the complicated geometry of the electrode. If it is desired to change the shape of the sound field, an entirely new electrode must be prepared.

Additionally, the characteristics of the drive electronics also effect the modulation performance, deflection performance, and efficiency of the AOM or AOD. The voltage, impedance and drive power capabilities of the particular power supplies used to drive the electrodes must be carefully matched to the impedance and other electrical characteristics of the piezo-electric material. As a result, the drive electronics often include complex circuits. It is also difficult to generate very high frequency acoustic waves with conventional electrodes as a result of the electrical capacitance of the piezo-electric material. Lastly, the piezo-electric material must be attached to the glass material. This step may be difficult to perform since it involves pressure under vacuum and requires low melt point metals to cold weld the piezo-electric material to the glass material.

Accordingly, what is desired is an acousto-optic device that has good performance, that provides greater flexibility to produce sound fields of different shape, and is capable of achieving high acoustic wave frequencies but that does not utilize an electrode and piezo-electric material to generate acoustic waves.

BRIEF SUMMARY OF THE INVENTION

The present invention relates to an acousto-optic device that does not use piezo-electric materials and therefore does away with the sound field shape constraint caused by the shape of the electrode.

In a first aspect of the invention, an acousto-optic device comprises a first light source for producing a light beam, a transparent material capable of transmitting the light beam along an optical path through the transparent material, a light-absorbing material applied to the transparent material, and a pulsed light source capable of directing a pulsed light beam at the light-absorbing material so as to produce acoustic waves within the transparent material that cross the optical path.

In another aspect of the invention, a method is provided for diffracting a light beam, comprising the steps of providing a transparent material, applying a light-absorbing material to the transparent material, transmitting a light beam along an optical path through the transparent material, and directing a pulsed light beam at the light-absorbing material to produce acoustic waves within the transparent material that cross the optical path, so as to diffract the light beam.

The present invention provides a significant advantage over the prior art by eliminating the conventional electrode and piezo-electric material used in conventional AOMs and AODs to generate the acoustic wave within the transparent material. Instead, by utilizing a pulsed laser beam, the present invention allows greater flexibility in design, since the shape of the sound front within the transparent material may be varied by simply changing the shape of the pulsed light beam applied to the light-absorbing material. Thus, the present invention eliminates the need to precisely shape the electrode. The invention also eliminates the need to match the impedance of the electrode and piezo-electric materials with the drive electronics.

The present invention finds utility in a variety of different applications. In one embodiment, the acousto-optic device may be used in a multi-channel device. In another embodiment, the acousto-optic device is used in an acoustic traveling wave lens. In yet another embodiment, the acousto-optic device is used to separate a primary laser beam from secondary satellite beams.

Yet another embodiment of the invention provides a method for selectively transmitting a light beam. A light-transmitting material is provided. A light-absorbing material is contacted to the light-transmitting material. A light beam is transmitted along an optical path through the light-transmitting material. A pulsed light beam is directed at the light-absorbing material to produce acoustic waves within the light-transmitting material that are co-axial with the optical path. This method results in selective reflection or transmission of the light beam through the light-transmitting material. This method allows the light beam to be filtered to a desired range of wavelengths, to be amplitude modulated, or to be spatially modulated.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
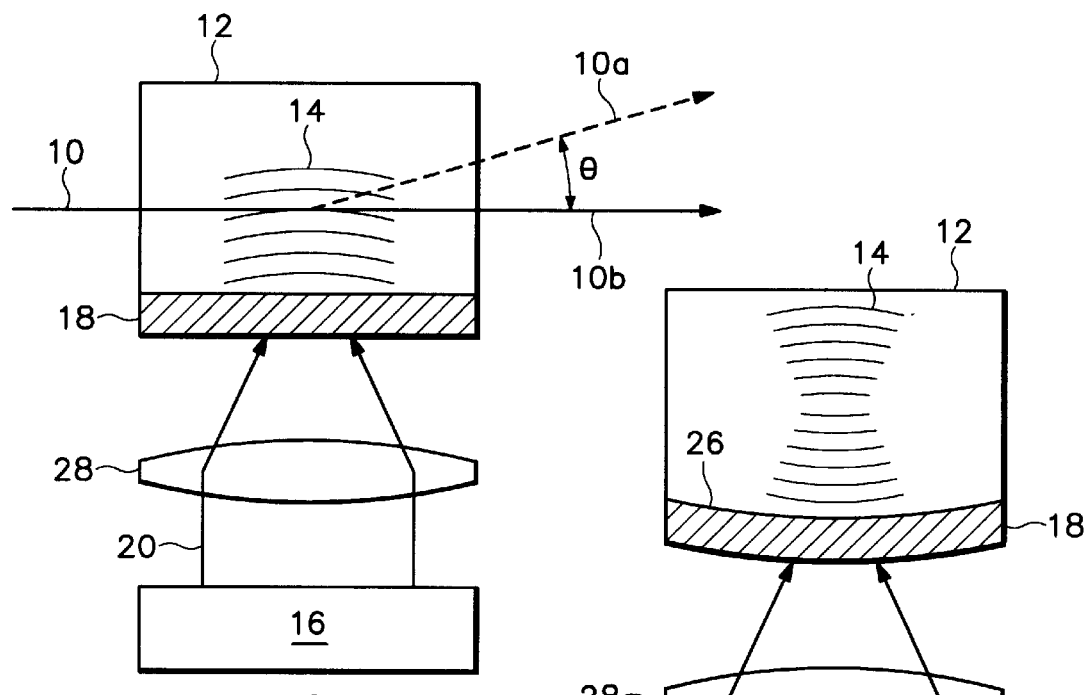
FIG. 1 is a schematic view of an exemplary embodiment of an acousto-optic device of the present invention.

Referring now to the figures, wherein like numerals refer to like elements, FIG. 1 illustrates one embodiment of an acousto-optic device of the present invention. As in a conventional AOM, a light beam 10 is directed toward a transparent material 12. However, in contrast to a conventional AOM, the sound waves 14 used to diffract the light beam 10 are generated using a pulsed light source 16, rather than a piezo-electric material. In the present invention, a light-absorbing material 18 is applied to one side of the transparent material 12. A pulsed light beam 20 is directed toward the light-absorbing material 18. The duration of the pulsed light beam 20 is so short that stress confinement occurs within the light-absorbing material 18. The light-absorbing material 18 generates acoustic waves in response, which propagate through the transparent material 12. The light beam 10 is diffracted into a beam 10a by the acoustic waves 14 in the transparent material 12 which were generated by the pulsed light beam 20. The materials and various embodiments of the invention are discussed in more detail below.

The light beam 10 may be any conventional light beam used in connection with an AOM or AOD. Common sources for the light beam include lasers such as gas lasers: Helium neon, helium cadmium, argon, argon-ion, and excimer solid state lasers, laser diodes, Nd Yag, and frequency double Yag. The light beam 10 may be of any conventional wavelength, from infra-red to visible to ultra-violet.

The transparent material 12 may be any material that has an acceptable level of optical transmission and that is also capable of transmitting acoustic waves. The material may be either glass or crystalline. Depending on the specific need of the application, materials are chosen based on, among other things, optical transmission efficiency, the velocity of sound in the material, and the coefficient of heat transfer. Exemplary materials suitable for use as the transparent material 12 include glass, fused silica, gallium arsenide, gallium phosphide, germanium, lead molybdate, tellurium oxide, lithium niobate, calcium fluoride, crystalline quartz, aluminum oxide (sapphire), diamond, and silicon.

Figure 2:
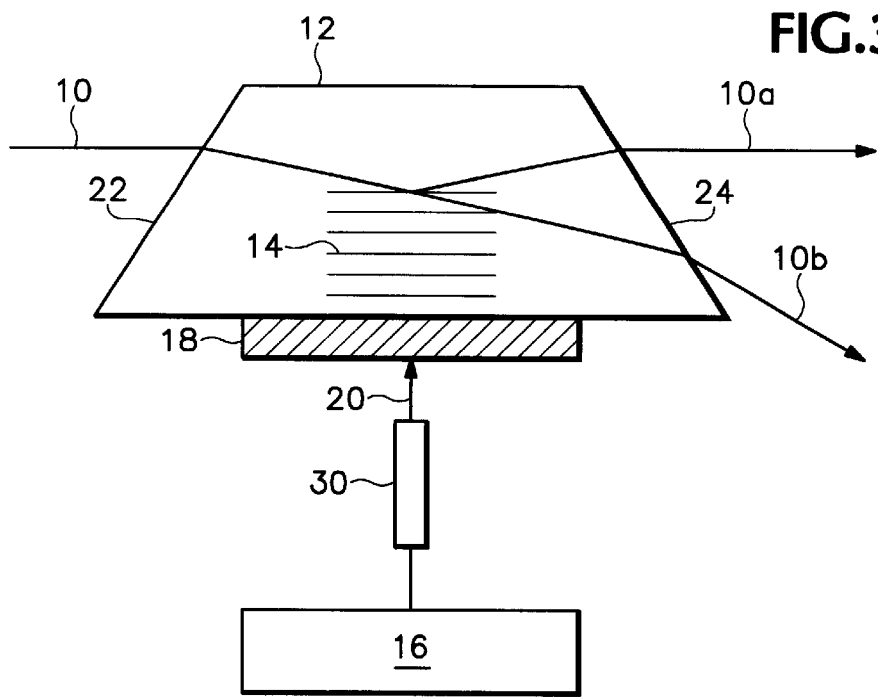
FIG. 2 is a schematic view of another exemplary embodiment of an acousto-optic device of the present invention.

The transparent material 12 may be shaped as desired to allow the optical path of the incoming light beam 10 within the transparent material 12 to cross the sound waves 14 generated by the pulsed light beam 20. As with conventional AOMs, the geometry of the transparent material 12 and the optical path of the light beam 10 may be chosen to direct the diffracted beam 10a in a particular direction. For example, as illustrated in FIG. 2, the incoming light beam 10 and diffracted light beam 10a may be made to be co-axial and parallel by cutting the front face 22 and back face 24 of the transparent material 12 appropriately.

Figure 3:
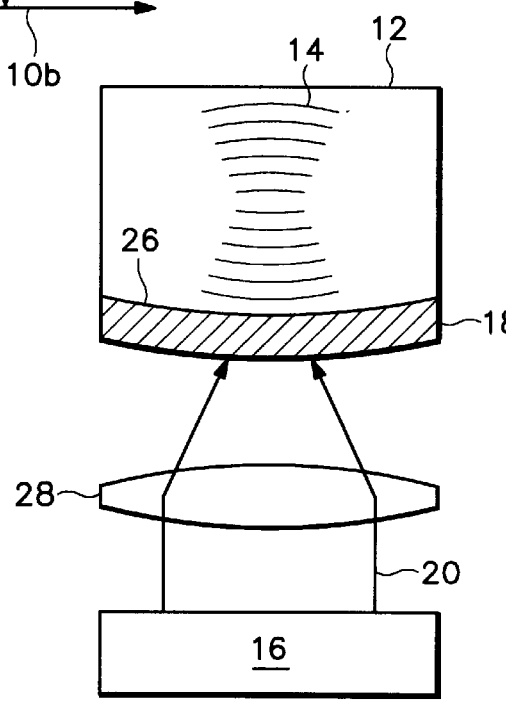
FIG. 3 is a schematic view of another exemplary embodiment of an acousto-optic device of the present invention showing a shaped transparent material.

Alternatively, the transparent material 12 may have a shaped exterior surface to modify the shape of the acoustic waves 14 generated by the pulsed light beam 20. For example, in FIG. 3, the exterior surface 26 to which the light-absorbing material 18 is applied has a convex surface to focus the acoustic waves 14 within the transparent material 12. The shape of the exterior surface 26 of the transparent material may be either cylindrical (as illustrated in FIG. 3), spherical, toroidal, or aspherical. For any of these shapes, the exterior surface 26 may be either concave or convex. Shaping the exterior surface 26 causes the acoustic waves 14 to become more concentrated at particular points within the transparent material 12 than would otherwise occur if the exterior surface 26 were simply planar. For example, as shown in FIG. 3, the acoustic waves 14 are concentrated at a point within the transparent material due to the concave nature of the exterior surface 26. Focusing the sound waves may improve the efficiency of the device by increasing the amount of the light beam 10 which is diffracted into the deflected beam 10a.

The light-absorbing material 18 may be any material that is capable of absorbing the pulsed light beam 20 and converting the light energy received from the pulsed light source 16 into acoustic waves. Exemplary materials that may be used for the light-absorbing material 18 include: metal oxides with appropriate absorption at the pulsed wavelength; a simple mixture of epoxy and india ink; or aluminum deposited in a thick film that is then anodized, the anodized surface being impregnated with organic or inorganic dye. The light-absorbing material 18 is in contact with the transparent material 12 so as to transfer or induce acoustic waves within the transparent material 12. The light-absorbing material is preferably a relatively uniform layer that is free from surface irregularities so as not to distort the acoustic waves that are produced. The light-absorbing material 18 may be applied or adhered to the transparent material 12 by any conventional method, such as by thin film vacuum deposition, chemical vapor deposition, molecular epitaxy, spin coating, or merely squeegeeing a thin layer of a solution that then dries. An exemplary light-absorbing material is a 0.010 mm thick layer of epoxy and india ink applied to the transparent material 12 by spin coating or squeegeeing against spacers to control the thickness.

The light-absorbing material 18 may be a layer of material from 0.00001 to 1 (mm) thick. In a preferred embodiment, the amplitude of the acoustic wave energy may be increased by matching the thickness of the light-absorbing material 18 to the frequency of the pulsed light source 16. The thickness of the light-absorbing material 18 is chosen so that it is at a harmonic or fundamental frequency of the light-absorbing material 18. That is, for a given modulus of elasticity of a material, and a given thickness, there will be specific light-pulse repetition rates that will excite the natural vibratory modes of the light absorbing layer. These natural vibratory modes are known as the natural (or fundamental) frequency at which the material oscillates during excitation from an external source, in this case, the stress confinement of the short pulse laser. When the pulsed light source 16 is pulsed at a frequency that matches the harmonic or fundamental frequency of the light-absorbing material 18, the efficiency of the generation of acoustic waves 14 by the pulsed light source 16 may be improved.

The light-absorbing material 18 is applied to the transparent material 12 at a location such that the acoustic waves 14 generated by the light-absorbing material 18 pass through the optical path of the light beam 10 in the transparent material 12. For example, the light-absorbing material 18 may be applied to an exterior surface 26 that is normal to the front face 22 at which the light beam 10 enters the transparent material 12, as illustrated in FIG. 1. As described above, the sound waves 14 travel through the transparent material 12 and interact with the light beam 10 much like a sinusoidal grating. As in the case of conventional AOM's and AOD's, the acousto-optic device 10 produces peak intensity in the diffracted beam 10a when the angle between the direction of travel of the sound waves and the optical path of the light beam 10 satisfies the Bragg angle condition. Thus, it is preferred that the light-absorbing material 18 be applied to the transparent material 12 along an exterior surface 26 so as to generate sound waves 14 that satisfy the Bragg angle condition with respect to the optical path of the light beam 10.

The transparent material 12 may also be provided with an optional sound absorbing material or acoustic absorber (not shown) located opposite the light-absorbing material. The sound absorbing material suppresses reflected acoustic waves. Alternatively, the back face may be angled to spread the echo pulse and help deplete its energy before it reflects through the light beam 10.

The pulsed light source 16 may be any light source capable of producing short, energetic pulses of light that are capable of generating stress confinement in the light-absorbing material 18. The pulsed time is so short that a phenomenon known as stress confinement occurs in the light-absorbing material 18. Stress confinement in the light-absorbing material 18 causes sound waves 14 to be formed in the transparent material 12. In order to produce stress confinement in the light-absorbing material, the pulsed time should be on the order of 0.0001 to 1 nanoseconds in duration. The pulsed light source 16 must also deliver sufficient energy to the light-absorbing material 18 so as to produce stress confinement, and preferably is capable of producing a light beam energy pulse of from 50 mJ to 1000 mJ. Exemplary pulsed light sources capable of producing pulsed light beams 20 suitable for use in the present invention include pulsed lasers such as mode-locked lasers, diode pumped fiber lasers, diode lasers, and Q-switched lasers.

One of the advantages of the present invention is that very high frequencies may be obtained for the acoustic waves. The frequency of sound within the transparent material 12 is related to the pulse frequency of the pulsed light beam. In the case of a 0.5 nanosecond pulse with an off time of 0.5 nanoseconds between pulses, it is possible to generate sound waves at a frequency of 1 gigahertz. Very high frequencies may be obtained by shortening the duration of the pulse and the period between pulses. Where the pulse duration is less than 1 nanosecond, frequencies greater than 1 gigahertz may be obtained.

The pulsed light beam 20 from the pulsed light source 16 may be directed toward the light-absorbing material 18 by means of any conventional optical system, such as by fiber optics or a conventional lens system. For example, FIG. 1 illustrates the use of a lens 28 to focus the pulsed light beam 20 onto the light-absorbing material 18. FIG. 3 illustrates the use of a fiber optic 30 to transmit the pulsed light beam 20. The use of one or more lenses allows the projected shape of the pulsed light beam 20 on the light-absorbing material to be varied as desired. Because the projected shape of the pulsed light beam 20 directly influences the shape of the resulting acoustic wave 14, the shape of the pulsed light beam 20 may be focused or otherwise manipulated by one or more lenses 28 to optimize the shape of the acoustic wave 14 for a particular application. A preferred shape may be an elliptical shape, with the long axis of the ellipse parallel to the direction of propagation of the light beam. This produces sound waves that interact with the light beam over a longer distance and helps to increase diffraction efficiency of the light beam.

The acousto-optic device of the present invention may be used to modulate the diffracted light beam 10a much like a conventional AOM. The pulsed light source 16 is held at a constant frequency, thus producing acoustic waves of constant frequency. The acoustic waves cause variations in density within the transparent material 12 and causes the light beam 10 to diffract, producing light beam 10a. The diffracted beam of light 10a leaves the transparent material 12 at a different angle than the un-diffracted light beam 10b. By turning the pulsed light source on or off, the diffracted beam 10a can be modulated.

The acousto-optic device may also be operated to deflect the light beam like a conventional AOD. The sound frequency may be varied by varying the pulse frequency of the pulsed light source 16. By varying the sound frequency, the diffracted light beam angle θ also varies. By varying the frequency of the pulsed light beam, the diffracted light beam 10a is made to scan from one angular output to another.

The present invention has a number of advantages over conventional AOMs. The primary advantage is that the performance of the acousto-optic device 10 is not limited by a piezo-electric material, the electrical characteristics of the drive electronics, or electrode geometry found in conventional AOM's and AOD's. The size and shape of the sound field can be changed by simply changing the size and shape of the pulsed light beam 20. The present invention thus allows greater flexibility in design by allowing the shape of the acoustic waves to be varied as desired without the necessity of changing the shape of an electrode. The complexity of the device is also reduced because there is no need to create a complicated electrode, and there is also no need to match the impedance of an electrical network used to drive the electrode.

The present invention also eliminates or reduces variances in diffraction intensity and polarity often found in conventional AOMs. Conventional AOMs produce a time variant diffracted intensity and change in polarization in the deflected beam as a result of temperature changes within the material when the electrical drive signal is switched on. The present invention minimizes changes in temperature in the transparent material by applying a relatively constant amount of light energy on the light-absorbing material 18 from the pulsed light source 16 even when the acousto-optic device is not deflecting the light beam 10. This may be done in one of two ways. First, when it is desired not to deflect the first light beam 10, the pulsed light beam 20 may be held steadily on (not pulsed), at an appropriate power level, while impinging on the light-absorbing material 18. Because the beam 20 is not pulsed, it will not generate acoustic waves, and no deflection will result. Alternatively, when the light beam 20 is not on, a third light beam (not shown) may be constantly directed (not pulsed) toward the light-absorbing material 18. A constant light beam applied to the light-absorbing material 18 when the pulsed light beam 20 is not on maintains the transparent material 12 at a relatively constant temperature. As a result, the diffracted light beam 10a undergoes less of a change in polarization and/or diffracted intensity as a function of time when the pulsed light beam 20 is switched from pulsing to a constant beam, or turned off and replaced with a constant beam.

Figure 4:
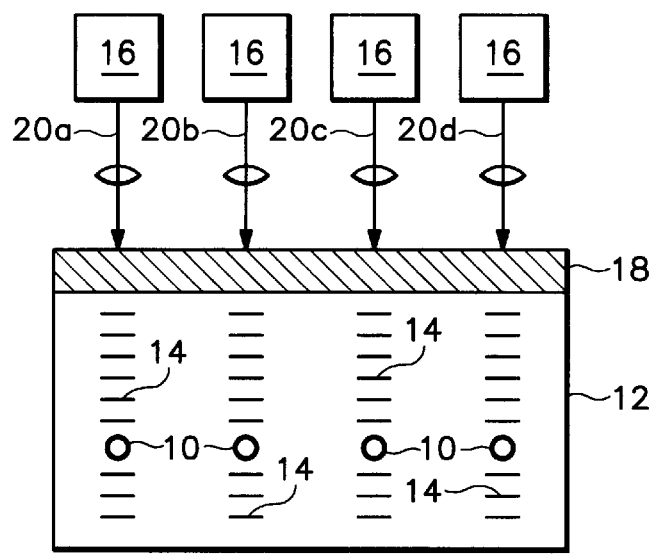
FIG. 4 is a schematic view of another exemplary embodiment of an acousto-optic device of the present invention showing a multiple channel device.

The present invention may be used in any application in which it is desired to use a conventional AOM or AOD. One application of the invention is an acousto-optic device having multiple channels, as illustrated in FIG. 4. Multiple pulsed light beams (such as light beams 20a–20d) may be directed toward the light-absorbing material 18 to produce multiple sound fields. In general, AOM and AOD devices that have multiple sound fields are said to have multiple channels. The present invention described here may operate as a multiple channel device, from 1 channel to n channels, by simply varying the number of pulsed light beams 20 applied to the light-absorbing material 18. For example, as shown in FIG. 4, the multiple channel device is comprised of four different pulsed light sources, each illuminating a different portion of the light-absorbing material 18. All channels can be operated simultaneously or individually or in any order by simply switching the appropriate pulsed light beam 20a to 20d on or off.

Figure 5:
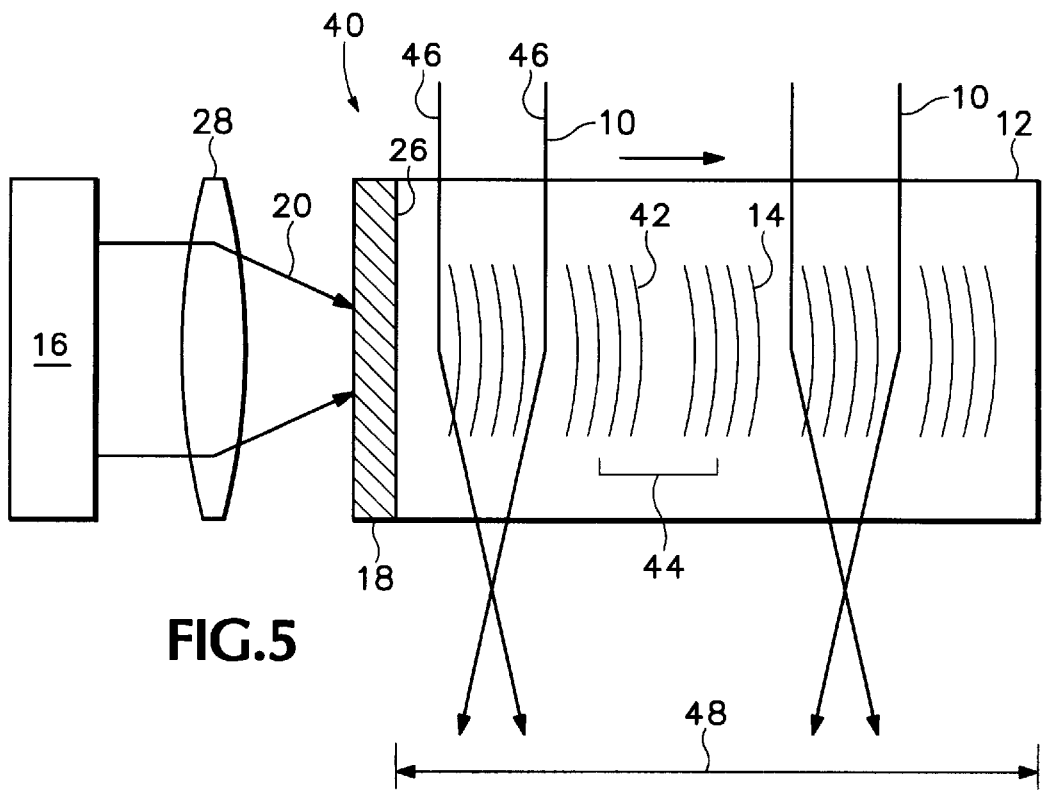
FIG. 5 is a schematic view of another exemplary embodiment of an acousto-optic device of the present invention used to focus a light beam.

Another application of the present invention is the use of the acousto-optic device in an acoustic traveling wave lens 40 as illustrated in FIG. 5. As shown in FIG. 5, a pulsed light beam 20 is directed at a light-absorbing material 18 located at an exterior surface 26 of the transparent material 12. The pulsed light beam 20 produces acoustic waves 14 which travel from left to right as illustrated in FIG. 5. The acoustic waves 14 distort the transparent material 12 locally so as to focus the light beam 10. The pulsed light source may be pulsed only once to produce a wave packet 42 comprised of only one wave, or may be pulsed in a manner to produce a group of acoustic waves in the wave packet 42. Hence, the wave packet may contain from one to many acoustic waves. The acoustic wave packets 42 may be separated in time by any desired period 44 by discontinuing the pulsing of the pulsed light source 16. The wave packets 42 are used to focus light beams 10. The period between individual waves within the wave packet 42 is varied in such a way as to focus the incoming rays 46 of the light beam 10.

The light beam 10 may be held stationary, or may be scanned across the transparent material. For example, the light beam 10 may be scanned from left to right as illustrated in FIG. 5 across the transparent material 12 by a tilting mirror or other conventional device (not shown). The scanning rate of the light beams may be matched to the velocity of the acoustic waves within the transparent material, so that the light beam is constantly focused as it is scanned from left to right across the transparent material 12. The acoustic traveling wave lens has the advantage that, when the light beam is scanned to match the velocity of the acoustic waves, a focused beam of light may be achieved over a focal plane size 48 that exceeds the focal plane size of a conventional lens (whether spherical or aspherical, and whether holographic or diffractive) that has the same focal length.

Figure 6A:
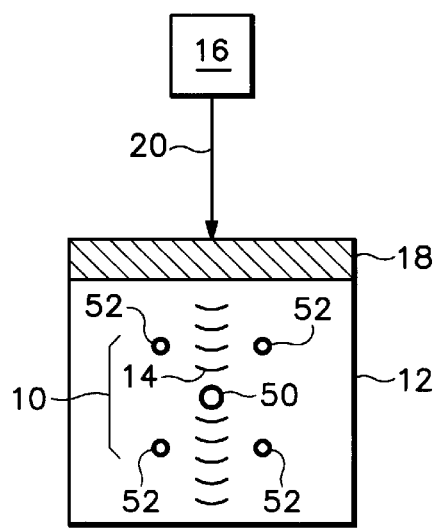
FIGS. 6a and 6b are schematic views of another exemplary embodiment of an acousto-optic device of the present invention used to separate a primary laser beam from satellite beams.
Figure 6B:
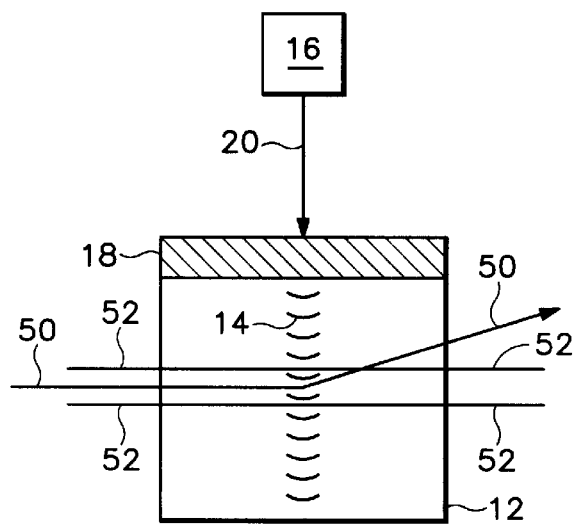

Another application of the present invention is illustrated in FIGS. 6a and 6b showing the use of an acousto-optic device of the present invention to eliminate satellite laser beams from a primary laser beam. FIG. 6a shows a front view of the transparent material showing a light beam 10 which is a laser beam comprised of a primary beam 50 and several satellite beams 52. The acoustic waves 14 are focused to a narrow region through which only the primary beam 50 passes. The primary beam 50 may thus be diffracted, (as shown in the side view of FIG. 6b) while the satellite beams 52 continue along their original path. This method of removing satellite beams 52 from a primary beam 50 has a significant advantage over the conventional method of removing satellite beams, which is to use a slit or other edge. The slit produces diffraction from the satellite beams, which then may continue to interfere with the primary beam. In contrast, the present method leaves the satellite beams unaffected. The primary beam is deflected to a new path without creating diffraction from the satellite beams.

Figure 7:
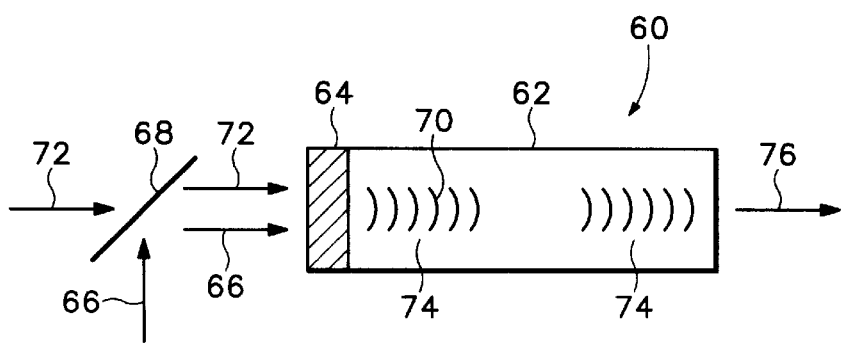
FIG. 7 is another embodiment of an acousto-optic device which selectively transmits or reflects light of a particular wavelength.

Yet another application of the present invention involves the use of an acousto-optic device to selectively transmit particular wavelengths of light through the light-transmitting material. Referring now more particularly to FIG. 7, an acousto-optic device 60 is shown having a light-transmitting material 62, a light-absorbing material 64, and a pulsed light beam 66. The pulsed light beam 66 is reflected from a beamsplitter 68 or similar device onto the light-absorbing surface 64. As in the embodiment of FIG. 1, the pulsed light beam generates acoustic waves 70 within the light-transmitting material 62.

Figure 8:
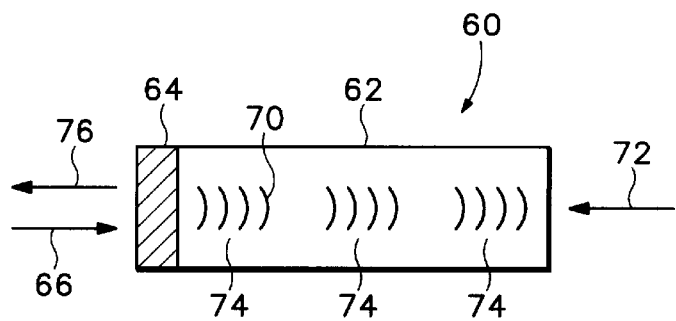
FIG. 8 is an alternative embodiment like that of FIG. 7.

The acousto-optic device 60 further includes a light beam 72. The light beam 72 may be comprised of one or more wavelengths. The light-absorbing material 64 is chosen so as to transmit at least a portion, and preferably substantially all, of the light beam 72 while nevertheless absorbing the pulsed light beam 66. The light beam 72 is directed toward the light-transmitting material so as to travel coaxially with the acoustic waves generated by the pulsed light beam 66. For example, as shown in FIG. 7, the pulsed light beam 66 is transmitted through the beam splitter 68 and through the light-absorbing material 64. Alternatively, as shown in FIG. 8 the light beam 72 may enter the light-transmitting material 62 on the side opposite the light-absorbing material 64 so as to be co-axial with the direction of travel of the acoustic waves 70.

The acoustic waves 70 generated within the light-transmitting material 62 are used to selectively transmit particular wavelengths of light. As shown in FIG. 7, the pulsed light beam 66 is pulsed to produce a series of wave packets 74. These wave packets induce regions of higher density and lower density within the light-transmitting material 62. The resulting series of wave packets 74 within the light-transmitting material selectively transmit or reflect particular wavelengths depending on the nature of the higher and lower density regions in the light-transmitting material 62. Light passing through the regions of different density will constructively or destructively interfere, depending on the wavelength of the light. The selective transmission through the light-transmitting material is thus similar to a conventional thin film in which alternating layers of high index and low index of refraction are deposited on an optically transparent medium and used to selectively transmit particular wavelengths. The amplitude and frequency of pulsing of the pulsed light beam 66 is chosen to yield acoustic waves 70 having the desired spacing and intensity so as to selectively transmit a desired range of wavelengths. The exiting beam 76 may thus have a relatively narrow range of wavelengths, such as 0.1 to 1 nm for optical wavelengths.

The acousto-optic device 60 may be used in several different applications. In one application, the acousto-optic device 60 is used to filter a desired wavelength of light through the light-transmitting material. Thus, if light beam 72 is comprised of several wavelengths of light when entering the light-transmitting material 62, the acousto-optic device may filter the light beam 72 so that the exit beam 76 is comprised of only one of the wavelengths of light beam 72.

In another application, the acousto-optic device 60 is used to modulate the light beam 72. The pulsed light beam 66 may be pulsed so as to selectively transmit (turn on or off) a desired wavelength or range of wavelengths of the light beam 72. For example, the pulsed light beam 66 may be alternately pulsed so as to prevent transmission of light beam 72, and turned off so as to allow transmission through the light-transmitting material 62.

Figure 9:
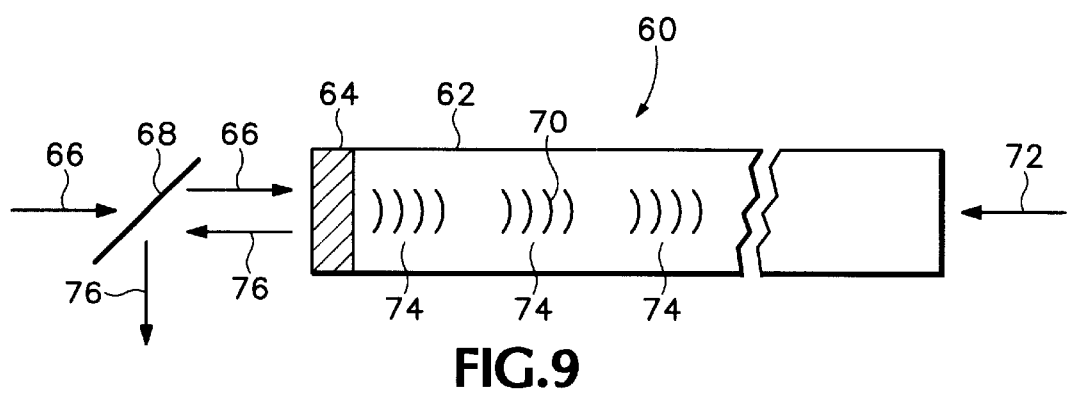
FIG. 9 is yet another alternative embodiment showing dispersion filtering of light beam from a fiber optic.

FIG. 9 shows yet another embodiment useful in the case of dispersion filtering in fiber optic applications. In FIG. 9, a light beam 72 enters the light-transmitting material 62, which is a fiber optic, where it interacts with the acoustic waves 70. The light beam 72 is comprised of several different wavelengths, or a range of wavelengths. The frequency and amplitude of pulsing of the light beam 66 is chosen so as to selectively transmit only a portion of the wavelengths comprising light beam 72. Thus, the light beam 76 emitted from the fiber optic and reflected by the beam-splitter 68 consists of a narrower range of wavelengths than the light beam 72.

Figure 10:
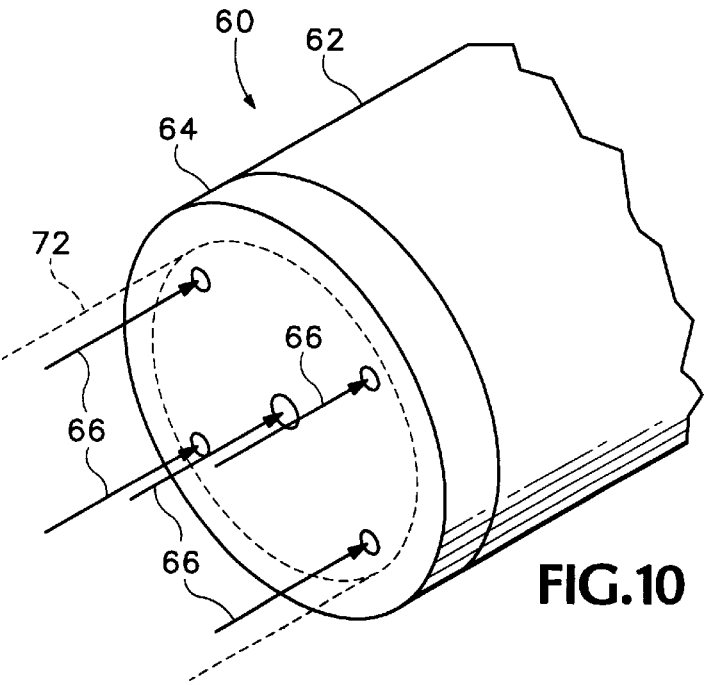
FIG. 10 is yet another alternative embodiment showing spatial modulation of a light beam.

The acousto-optic device may also be used to spatially modulate a light beam 72. FIG. 10 illustrates an acousto-optic device 60 in which several pulsed light beams 66 are directed toward the light-absorbing surface 64. Acoustic waves 70 are generated locally around the region at which the pulsed light beams 66 are absorbed. Light beam 72 is directed toward the light-absorbing material so as to pass through these several regions. Thus, by controlling each of the pulsed light beams 66, different portions of the light beam 72 may be selectively reflected or transmitted through the light-transmitting material 62.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. An acousto-optic device, comprising:
   (a) a first light source capable of producing a light beam;
   (b) a light-transmitting material capable of transmitting said light beam along an optical path;
   (c) a light-absorbing material in contact with said light-transmitting material; and
   (d) a second light source directing a pulsed light beam at said light-absorbing material so as to produce acoustic waves within said light-transmitting material that cross said optical path.

2. The acousto-optic device of claim 1 wherein said optical path and said acoustic waves are oriented with respect to one another to satisfy the Bragg condition.

3. The acousto-optic device of claim 1 wherein said acoustic waves diffract said light beam to produce a diffracted light beam.

4. The acousto-optic device of claim 3 wherein said frequency of said pulsed light source is varied so as to vary an angular deflection of said diffracted light beam.

5. The acousto-optic device of claim 3 wherein said amplitude of said pulsed light source is varied so as to modulate said diffracted light beam.

6. The acousto-optic device of claim 3 wherein said front face of said light-transmitting material, said rear face of said light-transmitting material, and said light-absorbing material are arranged so that said diffracted light beam is parallel with said light beam from said first light source.

7. The acousto-optic device of claim 1 wherein said exterior surface of said light-transmitting material adjacent to said light-absorbing material is non-planar.

8. The acousto-optic device of claim 1 wherein said device is a multi-channel device further comprising another light beam and another pulsed light beam.

9. The acousto-optic device of claim 1 wherein said light beam is focused by said acoustic waves.

10. The acousto-optic device of claim 9 wherein said light beam is scanned across said light-transmitting material.

11. The acousto-optic device of claim 1 wherein said optical path is perpendicular to said acoustic waves.

12. The acousto-optic device of claim 1 wherein said optical path is co-axial with said acoustic waves.

13. A method for diffracting a light beam, comprising the steps of:
   (a) providing a light-transmitting material;
   (b) contacting a light-absorbing material to said light-transmitting material;
   (c) transmitting a light beam along an optical path through said light-transmitting material; and
   (d) directing a pulsed light beam at said light-absorbing material to produce acoustic waves within said light-transmitting material that cross said optical path, so as to produce a diffracted light beam.

14. The method of claim 13 wherein said frequency of said pulsed light beam is varied so as to vary an angular deflection of said diffracted light beam.

15. The method of claim 13 wherein said amplitude of said pulsed light beam is varied so as to modulate said diffracted light beam.

16. The method of claim 13 wherein said front face of said light-transmitting material, said rear face of said light-transmitting material, and said light-absorbing material are arranged so that said diffracted light beam is parallel with said light beam.

17. The method of claim 13 wherein an exterior surface of said light-transmitting material adjacent to said light-absorbing material is non-planar.

18. The method of claim 13 further comprising directing another light beam into said light-transmitting material, and directing another pulsed light beam at said light-absorbing material, so as to produce another diffracted light beam.

19. A method for focusing a light beam, comprising the steps of:
    (a) providing a light-transmitting material;
    (b) contacting a light-absorbing material to said light-transmitting material;
    (c) transmitting a light beam along an optical path through said light-transmitting material; and
    (d) directing a pulsed light beam at said light-absorbing material to produce acoustic waves within said light-transmitting material that cross said optical path, so as to focus said light beam.

20. The method of claim 19 further comprising the step of scanning said light beam across said light-transmitting material.

21. A method for selectively transmitting a light beam, comprising the steps of:
    (a) providing a light-transmitting material;
    (b) contacting a light-absorbing material to said light-transmitting material;
    (c) transmitting a light beam along an optical path through said light-transmitting material; and
    (d) directing a pulsed light beam at said light-absorbing material to produce acoustic waves within said light-transmitting material that are co-axial with said optical path.

22. The method of claim 21 wherein said light beam has a narrower range of wavelengths after passing through said acoustic waves.

23. The method of claim 22 wherein said light beam is amplitude modulated by said acoustic waves.

24. The method of claim 22 wherein said light beam is spatially modulated by said acoustic waves.

* * * * *